Figure 1:
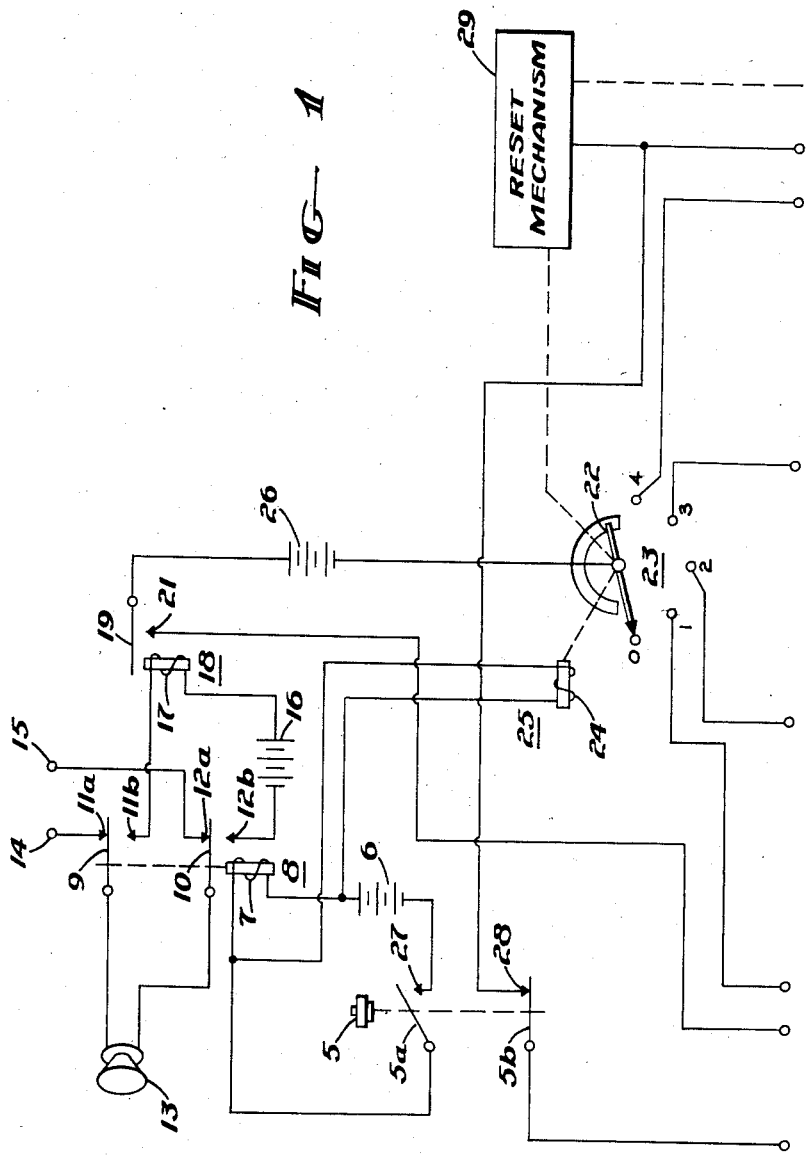

May 12, 1959 H. W. LEHMAN ET AL 2,886,758
VOICE-OPERATED RADIO TUNING SYSTEM
Filed May 28, 1957 2 Sheets-Sheet 1

INVENTORS
HARRY W. LEHMAN
RALPH J. MEYER
By Moody and Harsha
ATTORNEYS

May 12, 1959 H. W. LEHMAN ET AL 2,886,758
VOICE-OPERATED RADIO TUNING SYSTEM
Filed May 28, 1957 2 Sheets-Sheet 2

INVENTORS
HARRY W. LEHMAN
RALPH J. MEYER
By Moody and Harsha
ATTORNEYS

United States Patent Office 2,886,758
Patented May 12, 1959

2,886,758

VOICE-OPERATED RADIO TUNING SYSTEM

Harry W. Lehman, Marion, and Ralph J. Meyer, Cedar Rapids, Iowa, assignors to Collins Radio Company, Cedar Rapids, Iowa, a corporation of Iowa Application May 28, 1957, Serial No. 662,125

6 Claims. (Cl. 318—467)

This invention relates to automatic tuning mechanisms and more particularly to such mechanisms which are voice-operated.

In many instances it is desirable to be able to tune a radio or other frequency responsive devices without a substantial use of the hands. It is preferable that such controls be adapted to being controlled by the voice of a person to tune to the desired frequency. One instance where such a system would be extremely valuable is in the modern single-seated aircraft where the pilot should at all times have complete freedom of movement to control the flight of the aircraft. In such aircraft, the removal of one or both hands to automatically tune a radio receiver might result in an accidental crash of the aircraft. In one embodiment of this invention, the pilot of such an aircraft could tune any desired communication channel merely by depressing a button located on the control stick and counting the desired frequency. Such a button or switch would be similar to the gun switch or other switches which are presently placed upon the control stick of an aircraft.

Voice-operated relays are old in the art, and a voice-operated relay which would be suitable for operation in this invention is described in the Patent No. 1,636,031, issued July 19, 1927 to S. B. Wright. In this invention a control mechanism is associated with a voice-operated relay. This control mechanism is a stepping switch arrangement which may be used to select any desired one of a plurality of positions. Such selection results from the actuation of the stepping switch arrangement by the utterance of a word or sound to actuate the voice-operated relay. One embodiment of this invention was designed so that the pilot or operator of an aircraft could count into his normal microphone to select desired frequency digits in the communication channel. Thus, to select a frequency of 4,500 kilocycles, the operator would depress the switch on the control stick and count to four. Then the operator would release the button or switch on the control stick. The first digit is then placed on a shaft positioning control mechanism. A stepping switch arrangement actuated by the switch on the control stick applies the second digit to a second stepping switch arrangement and the pilot now counts to five and releases the button. Thus, a stepping switch arrangement acting in response to the actuation of a switch selectively connects the voice pulses to a second group of stepping switches. This second group of stepping switches operates to selectively position a shaft which controls the tuning of a tuning unit. A predetermined frequency is selectively chosen for a communication equipment.

One remote control system associated with the second stepping switch mechanisms which permits a motor to rotate a shaft to a predetermined position corresponding to the selected digits set into the second stepping switch arrangement is more fully described in the Patent No. 2,476,373, issued to Richard W. May and Horst M. Schweighofer, July 19, 1941. Some such control system may be included with this invention.

It is an object of this invention to provide a tuning system which is selectively operated by voice signals. It is a further object of this invention to provide a tuning system which will automatically select a desired frequency in response to the vocal utterances of a plurality of digits. It is a still further object of this invention to provide a tuning system which will automatically select a desired frequency in response to vocal signals and subsequently enable the invention so that a successive frequency may be selected.

Figure 2:
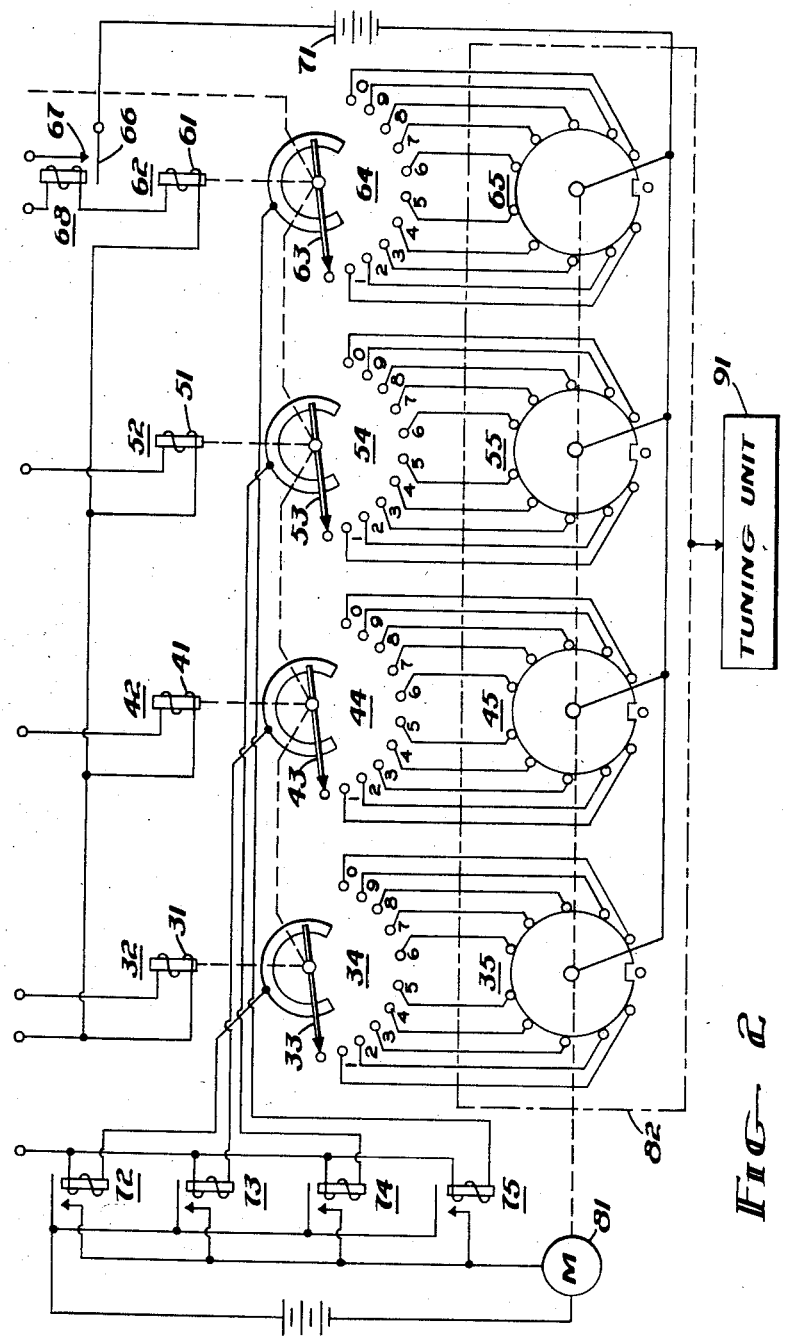

These and other objects of this invention will become apparent when the following description is read in conjunction with the accompanying drawings, in which Figure 1 is a schematic diagram of a portion of one embodiment of this invention, and Figure 2 is a schematic diagram of the remainder of one embodiment of this invention.

Referring now specifically to Figure 1, a control switch 5 is shown as a manually depressible button. Control switch 5 includes the switch arm 5a and the switch arm 5b. In the normal position of switch 5, switch arm 5a is normally open and switch arm 5b is normally closed. Switch arm 5b is normally closed on contact 28. When switch 5 is operated or depressed, switch arm 5a closes on contact 27 and the arm 5b then is open at contact 28. Included in a circuit with the switch 5 and the switch arm 5a is a source of electromotive force 6 and a relay 8 including a winding 7 thereon. Connected in parallel across the winding 7 of relay 8 is a second relay 25 having a winding 24 wound thereon. A microphone 13 is necessary in this invention and in most instances would be the communication microphone of the pilot or any desired operator in an aircraft.

As shown in Figure 1, this microphone 13 is normally connected through switch arms 9 and 10 to contacts 11a and 12a. These contacts 11a and 12a are connected to the terminals 14 and 15 which are connected to the communication equipment aboard the vehicle or aircraft. The contact arms 9 and 10 are controlled by operation of the relay 8. Contacts 11b and 12b are connected to a source of electromotive force 16 and a winding 17 on relay 18. Relay 18 is a voice-operated relay and may be, for purposes of this invention, considered similar to the relay described in the patent to Wright, noted above. There is one contact arm 19 controlled by the voice-operated relay 18 which closes on contact 21 when relay 18 is actuated.

The relay 25 is connected to a stepping switch mechanism 23. Each time the relay 25 is actuated, the arm 22 of the stepping switch mechanism 23 is moved one position. Each position on stepping switch 23 is connected to a relay 32, 42, 52 or 62. Each of these relays has a respective winding 31, 41, 51 and 61 connected to the contacts of the stepping switch 23, the arm 22, and a source of electromotive force 26. The relays 32, 42, 52 and 62 operate stepping switches 34, 44, 54 and 64. Thus, for each actuation of the relay 32, the arm 33 of stepping switch 34 will be moved one position. These stepping switches operate in a manner which is well known in the art and will not be described in detail herein.

Individually associated with each of the stepping switches 34, 44, 54 and 64 is another relay 72, 73, 74 or 75. These relays are connected to the motor 81 so that if any one of these relays is actuated, the motor 81 operates. The relay 68, which is serially connected to the winding 61 on the relay 62, must also be operated before the relays 72, 73, 74 or 75 operate. Associated with and connected to each of the stepping switches 34, 44, 54, and 64 is a switch element 35, 45, 55 and 65. These switch elements include a rotatable member which is connected to the shaft of motor 81. As motor 81 turns, this switch element will turn until such time as the open section of the rotatable element is opposite the energized contact of switch 35, 45, 55 and 65. A selected position of each of the switch elements is determined by location of the cut-out sections on the switch, and the position of the shaft on motor 81 is also determined. Mechanically connected to the shaft positioning unit 82 is a tuning unit 91. This tuning unit may be any of the well-known types where the frequency is controlled by a tank circuit or crystals, but, in any event, the rotation of the shaft connected to motor 81 will result in a specific frequency output from the tuning unit 91 corresponding to a specified shaft position.

In operation, the operator would depress the button or switch 5 and close switch arm 5a on contact 27. This would connect the electromotive force or battery 6 across the winding 7 of relay 8 and the winding 24 of relay 25. A source of E.M.F. applied across these windings will cause a current to flow through the windings and operate both relay 8 and relay 25. Operation of relay 25 moves the arm 22 of stepping switch 23 one position, in this instance to the number one position. The operation of relay 8 connects the switch arms 9 and 10 to the contacts 11b and 12b. This effectively removes the microphone 13 from the normal communication channels and places it in the frequency selection system of this invention.

With the arms 9 and 10 connected to the contacts 11b and 12b, the voice-operated relay will be responsive to voice signals in the microphone 13. Now that the stepping switch has been moved to the first position, the pilot, by keeping the button depressed, may select the first digit of his desired frequency. To select the first digit, the pilot would count into the microphone up to the desired number equal to the first digit of the desired frequency. Thus, if we again use the 4,500 kilocycles example, the pilot would count into the microphone as follows: one, two, three, four, although obviously the pilot could repeat any sound distinctly four times since the relay is not frequency sensitive. With each number counted by the operator or pilot, the voice-operated relay 18 would be actuated. This means that a pulse of energy would be applied in response to each number through the source of E.M.F. 26, the switch arm 19, the contact 21 to the winding 31 of the relay 32. Each time that relay 32 was actuated, due to this pulse generated by the operation of voice-operated relay 18, the arm 33 of stepping switch 34 would be moved one position. Thus, in this instance, stepping switch arm 33 would be moved to contact number four of the stepping switch 34.

When the pilot has counted to the desired number or first digit of the frequency to be selected, he releases the switch 5. Then, to select the second digit, he depresses the switch 5 which actuates the arm 22 of the stepping switch 23 to its number two contact. This movement is similar to that described above for the number one contact. The desired number corresponding to the second digit is counted into the microphone by the pilot and applied to the stepping switch 44 by contact 42 through stepping switch 23. In this instance, the pilot would count to five and the arm 43 would be positioned at the number five contact of the stepping switch 44. The pilot would repeat the above described steps for each of the desired numbers and the stepping switches 54 and 64 would each be placed to their respective zero contacts in the illustrative example.

When the pilot is setting the fourth digit, the current flowing in winding 61 of relay 62 will also flow through the winding of relay 68. This current will actuate the relay 68 thereby closing the switch arm 66 on the contact 67. Relay 68 is a time delay relay and will not release until a predetermined time has elapsed from the instant of its operation. Such relays are well known in the art and will not be described further herein. When the pilot or operator releases the switch 5, after having selected the fourth digit, the switch arm 5b is closed on contact 28 as shown in Figure 1. With arm 5b closed on contact 28, a current will flow in the circuit including the contact 28, the arm 5b, the windings of relays 72, 73, 74 and 75, the switch arms 33, 43, 53 and 63, the contacts in the switch elements 35, 45, 55 and 65, the source of electromotive force 71, the contact arm 66 and the contact 67. This current flow will cause each of the relays 72—75 to operate. Operation of any one of these relays applies the source of E.M.F. 71 to the motor 81 thereby energizing the motor 81.

Motor 81 rotates the shaft which is connected to the switch elements 35, 45, 55 and 65 and rotates each switch element until the removed section is opposite the desired contact. In the operative illustrative instance of element 35 this occurs when the cut-out area of the rotatable element is opposite the fourth contact. Current can then no longer flow through the switch element 35, and the relay 72 will be de-energized. When each of the selected numbers has been chosen by the rotation of the respective switch elements, the relays 72, 73, 74 and 75 will all be released and the motor 81 will cease to operate.

The current flowing in the circuit including the switch element 34, 45, 55, and 65 is connected to the reset mechanism 29. The time delay relay 68 will release at some time subsequent to the selection of the final digit by the switch element 65 and associated circuitry. The reset mechanism 29 is designed to operate at a predetermined period after the release of the time delay relay 68, and when it does release, it moves each of the stepping switches in this invention to their respective initial positions. Such reset mechanisms are well known in the art, and any of the many available models would be satisfactory in this invention. As soon as the reset mechanism 29 has operated, this invention is enabled and is prepared to set a new tuned frequency in the tuning unit 91 by the shaft positioning of the element 82 as described above.

Although this invention has been defined with respect to a particular embodiment thereof, it should not be so limited as changes and modifications may be made therein which are within the full intended scope of the invention as defined by the appended claims.

What is claimed is:

1. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch, said first stepping switch responsive to the operation of said manual switch means whereby for each operation of said manual switch means said first stepping switch moves one position, a plurality of second stepping switches, said first stepping switch operable to connect said voice-operable switch means to a selected one of said second stepping switches, a plurality of fixed contacts associated with each of said second stepping switches; shaft positioning means comprising a motor, a plurality of groups of fixed contacts, and a rotatable switch means associated with each group of contacts; said fixed contacts of said plurality of groups of fixed contacts individually connected to one of the fixed contacts associated with said second stepping switches, means responsive to the positioning of one of the plurality of said second stepping switches to energize said shaft positioning means, means for de-energizing said shaft positioning means when each of said rotatable switch means is positioned opposite the selected fixed contact; said last-mentioned fixed contact being selected by said voice-operable switch means, said first stepping switch, and said second stepping switches; and control means connected to said motor and to said second stepping switches to stop said motor when said shaft is correctly positioned.

2. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch means, said first stepping switch means responsive to the operation of said manual switch means whereby for each operation of said manual switch means said first stepping switch means moves one position, a plurality of second stepping switch means, said first stepping switch operable to connect said voice-operable switch means to a selected one of said second stepping switch means, a plurality of fixed contacts associated with each of said second stepping switch means; shaft positioning means comprising a motor, a plurality of groups of fixed contacts, and a rotatable switch means associated with each group of contacts; said fixed contacts of said plurality of groups of fixed contacts individually connected to one of the fixed contacts associated with said second stepping switch means, means responsive to the positioning of one of the plurality of said second stepping switch means to energize said shaft positioning means, means for de-energizing said shaft positioning means when each of said rotatable switch means is positioned opposite the selected fixed contact; and said selected fixed contact being selected by said voice-operable switch means, said first stepping switch means, and said second stepping switch means.

3. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch means, said first stepping switch means responsive to the operation of said manual switch means whereby for each operation of said manual switch means said first stepping switch means moves one position, a plurality of second stepping switch means, means including said first stepping switch means for connecting said voice-operable switch means to a selected one of said second stepping switch means, each of said second stepping switch means having a plurality of fixed contacts; shaft positioning means comprising a motor, a plurality of groups of fixed contacts, and a rotatable switch means operated by said motor and associated with each group of contacts; said fixed contacts of said plurality of groups of fixed contacts individually connected to one of the fixed contacts of said second stepping switch means, means responsive to the positioning of one of the plurality of said second stepping switch means to energize said shaft positioning means, means for de-energizing said shaft positioning means when each of said rotatable switch means is positioned opposite the selected fixed contact; said selected fixed contact being selected by said voice-operable switch means, said first stepping switch means, and said second stepping switch means; and control means connected to said motor and to said second stepping switch means to effectively stop said motor when said shaft is correctly positioned.

4. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch means, said first stepping switch means responsive to the operation of said manual switch means whereby for each operation of said manual switch means said first stepping switch means moves one position, a plurality of second stepping switch means, means including said first stepping switch means for connecting said voice-operable switch means to a selected one of said second stepping switch means, each of said second stepping switch means having a plurality of fixed contacts; shaft positioning means comprising a motor, a plurality of groups of fixed contacts, and a rotatable switch means operated by said motor and associated with each group of contacts; said fixed contacts of said plurality of groups of fixed contacts individually connected to one of the fixed contacts of said second stepping switch means, means responsive to the positioning of one of the plurality of said second stepping switch means to energize said shaft positioning means, means for de-energizing said shaft positioning means when each of said rotatable switch means is positioned opposite the selected fixed contact; said selected fixed contact being selected by said voice-operable switch means, said first stepping switch means, and said second stepping switch means; control means connected to said motor and to said second stepping switch means to effectively stop said motor when said shaft is correctly positioned, and a tuning means connected to said shaft positioning means whereby a predetermined frequency is selected for each shaft position.

5. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch, said first stepping switch responsive to the operation of said manual switch means whereby for each operation of said manual switch means said first stepping switch moves one position, a plurality of second stepping switches, means including said first stepping switch for connecting said voice-operable switch means to a selected one of said second stepping switches, each of said second stepping switches having a plurality of fixed contacts; shaft positioning means comprising a motor, a plurality of groups of fixed contacts, and a rotatable switch means operated by said motor and associated with each group of contacts; said fixed contacts of said plurality of groups of fixed contacts individually connected to one of the fixed contacts of said second stepping switches, means responsive to the positioning of one of the plurality of said second stepping switches to energize said shaft positioning means, means for de-energizing said shaft positioning means when each of said rotatable switch means is positioned opposite the selected fixed contact; said selected fixed contact being selected by said voice-operable switch means, said first stepping switch, and said second stepping switches; control means connected to said motor and to said second stepping switches to stop said motor when said shaft is correctly positioned, and a reset mechanism mechanically connected to each of said first and each of said second stepping switches operable upon the final release of said manually operable switch to automatically return all stepping switches to their neutral positions.

6. A remote control system comprising a manually operable switch means, first switch means responsive to the operation of said manual switch means, voice-operable switch means, a microphone, said microphone normally connected to output terminals, said first switch means connecting said microphone to said voice-operable switch means when said first switch means is operated, a first stepping switch, said first stepping switch responsive to the operation of said manual switch means whereby for each operation of said manual switch means said first stepping switch moves one position, a plurality of second stepping switches, means including said first stepping switch for connecting said voice-operable switch means to a selected one of said second stepping switches, each of said second stepping switches having a plurality of fixed contacts, said second stepping switches sequentially positioned on a selected one of said fixed contacts by voice currents operating on said voice-operable switch; shaft positioning means comprising a motor, a plurality of groups of fixed contacts, and a rotatable switch means operated by said motor and associated with each group of contacts; said fixed contacts of said plurality of groups of fixed contacts individually connected to one of the fixed contacts of said second stepping switches, means responsive to the positioning of one of the plurality of said second stepping switches to energize said shaft positioning means, means for de-energizing said shaft positioning means when each of said rotatable switch means is positioned opposite the selected fixed contact; said selected fixed contact being selected by said voice-operable switch means, said first stepping switch, and said second stepping switches; control means connected to said motor and to said second stepping switches to stop said motor when said shaft is correctly positioned, and a reset mechanism mechanically connected to each of said first and each of said second stepping switches operable upon the final release of said manually operable switch in each selection sequence to automatically return all stepping switches to their neutral positions.

References Cited in the file of this patent

UNITED STATES PATENTS

| | | |
|---|---|---|
| 1,954,669 | FitzGerald | Apr. 10, 1934 |
| 2,238,555 | Dudley | Apr. 15, 1941 |
| 2,472,536 | Keil et al. | June 7, 1949 |

OTHER REFERENCES

Kent: Abstract of application Serial No. 270,083; published June 30, 1953.